US012792711B2

(12) United States Patent
Yoo et al.

(10) Patent No.: US 12,792,711 B2
(45) Date of Patent: Nov. 10, 2026

(54) SPORTS CENTER SYSTEM AND OPERATION METHOD THEREOF

(71) Applicant: DRAX INC., Anyang-si (KR)

(72) Inventors: Seon Kyung Yoo, Seoul (KR); Jae Sang Park, Seongnam-si (KR)

(73) Assignee: DRAX INC., Anyang-si (KR)

( * ) Notice: Subject to any disclaimer, the term of this patent is extended or adjusted under 35 U.S.C. 154(b) by 107 days.

(21) Appl. No.: 18/687,076

(22) PCT Filed: Aug. 23, 2022

(86) PCT No.: PCT/KR2022/012594
§ 371 (c)(1),
(2) Date: Feb. 27, 2024

(87) PCT Pub. No.: WO2023/033440
PCT Pub. Date: Mar. 9, 2023

(65) Prior Publication Data

US 2024/0370543 A1 Nov. 7, 2024

(30) Foreign Application Priority Data

| | | |
|---|---|---|
| Aug. 31, 2021 | (KR) | 10-2021-0115809 |
| Dec. 28, 2021 | (KR) | 10-2021-0190359 |
| Dec. 28, 2021 | (KR) | 10-2021-0190360 |
| Dec. 28, 2021 | (KR) | 10-2021-0190361 |
| Jul. 22, 2022 | (KR) | 10-2022-0091153 |

(51) Int. Cl.
*G06F 21/32* (2013.01)

(52) U.S. Cl.
CPC .................................... *G06F 21/32* (2013.01)

(58) Field of Classification Search
CPC ......... G06F 21/32; A63B 71/06; G06Q 50/10; G06Q 50/22; G07C 9/37
See application file for complete search history.

(56) References Cited

U.S. PATENT DOCUMENTS 6,601,016 B1 * 7/2003 Brown ............... A63B 24/0062 702/182
9,432,361 B2 * 8/2016 Mahaffey ............ H04L 63/0853
(Continued)

FOREIGN PATENT DOCUMENTS

KR 10-2017-0000963 A 1/2017
KR 10-2017-0002175 A 1/2017
(Continued)

OTHER PUBLICATIONS

Extended European Search Report Feb. 18, 2025 in application No. 22864943.0.

(Continued)

*Primary Examiner* — Philip J Chea
*Assistant Examiner* — Dorianne Alvarado David
(74) *Attorney, Agent, or Firm* — Sughrue Mion, PLLC

(57) ABSTRACT

Provided are a sports center system and an operation method thereof, wherein the sports center system includes an authentication device configured to authenticate a user by using biometric information of the user and a management server configured to grant activation authority over exercise equipment to a user terminal corresponding to the user who is successfully authenticated.

11 Claims, 9 Drawing Sheets

(56) References Cited

U.S. PATENT DOCUMENTS

| | | | | |
|---|---|---|---|---|
| 2002/0082142 | A1* | 6/2002 | Cannon | A63B 71/0697 482/1 |
| 2004/0077462 | A1* | 4/2004 | Brown | A63F 13/323 482/8 |
| 2007/0260887 | A1* | 11/2007 | Ito | G07C 9/257 713/186 |
| 2011/0090092 | A1* | 4/2011 | Birrell | G06Q 10/06 340/870.07 |
| 2013/0035207 | A1* | 2/2013 | Abuelsaad | G16H 40/63 482/8 |
| 2014/0282877 | A1* | 9/2014 | Mahaffey | H04W 12/33 726/3 |
| 2015/0082408 | A1* | 3/2015 | Yeh | A61B 5/02055 726/9 |
| 2015/0364058 | A1* | 12/2015 | Lagree | G09B 19/003 434/257 |
| 2017/0262589 | A1* | 9/2017 | Ortiz | H04W 12/33 |
| 2018/0214729 | A1* | 8/2018 | Rubin | A63B 24/0087 |
| 2019/0118066 | A1* | 4/2019 | Cardona | A63B 24/0062 |
| 2020/0113518 | A1* | 4/2020 | Mollohan | G06F 1/163 |
| 2021/0174268 | A1* | 6/2021 | Levinson | G06Q 10/02 |
| 2022/0342969 | A1* | 10/2022 | Watterson | A63B 22/0076 |
| 2025/0099837 | A1* | 3/2025 | Malm | A63B 22/0242 |

FOREIGN PATENT DOCUMENTS

| | | | | | |
|---|---|---|---|---|---|
| KR | 10-2017-0061459 | A | | 6/2017 | |
| KR | 20170061459 | A | * | 6/2017 | G06Q 50/22 |
| KR | 10-2017-0118299 | A | | 10/2017 | |
| KR | 10-2020-0046232 | A | | 5/2020 | |

OTHER PUBLICATIONS

International Search Report for PCT/KR2022/012594 dated Dec. 2, 2022.

* cited by examiner

SPORTS CENTER SYSTEM AND OPERATION METHOD THEREOF

CROSS REFERENCE TO RELATED APPLICATIONS

This application is a National Stage of International Application No. PCT/KR2022/012594 filed Aug. 23, 2022, claiming priority based on Korean Patent Application No. 10-2021-0115809 filed Aug. 31, 2021, Korean Patent Application No. 10-2021-0190360 filed Dec. 28, 2021, Korean Patent Application No. 10-2021-0190359 filed Dec. 28, 2021, Korean Patent Application No. 10-2021-0190361 filed Dec. 28, 2021 and Korean Patent Application No. 10-2022-0091153 filed Jul. 22, 2022.

TECHNICAL FIELD

The present disclosure relates to a sports center system and an operation method thereof.

BACKGROUND ART

Recently, as work and life balance, which refers to the balance between work and personal life, has attracted attention, consumption for personal life, such as exercise after work, on weekends, or in spare time, has increased. As one of the work and life balance, the desires of users to manage their health have increased, and to improve the quality of life with a small investment of time, users who engage in various exercises such as swimming, fitness, personal training (PT), golf, and Pilates have increased.

In general, sports centers may be used only by members who have completed membership authentication. Methods of effectively performing membership authentication and effectively guiding exercise equipment to authenticated members have been sought.

DISCLOSURE

Technical Problem

The present disclosure provides a sports center system capable of reducing costs caused by authentication by using different methods for authentication of an entry device for a sports center and authentication of exercise equipment, and an operation method thereof.

Provided are a sports center system for providing an optimal exercise movement line to a user by using a list of pieces of exercise equipment for a user, a location of the user, and the like, and an operation method thereof.

Technical Solution

A system for operating a sports center, according to an aspect of the present disclosure, includes: an authentication device configured to authenticate a user by using biometric information of the user; a management server configured to grant activation authority over exercise equipment to a user terminal corresponding to the user who is successfully authenticated; and the exercise equipment configured to switch to an exercise mode in a standby mode state when the user terminal enters a particular area.

The system further includes an entry device configured to determine whether the user enters or exits the sports center, wherein the management server is further configured to grant the activation authority over the exercise equipment to the user terminal when the user who has successfully authenticated is determined to enter the sports center through the entry device.

The management server may be further configured to terminate the granting of the activation authority to the user terminal when a certain period of time elapses after granting the activation authority to the user terminal.

The management server may be further configured to terminate the granting of the activation authority to the user terminal when the user is determined to have exit the sports center through the entry device.

The biometric information of the user may include at least one of face information, fingerprint information, iris information, blood vessel information, and voice information of the user.

The exercise device may be further configured to provide an exercise program based on information regarding the user.

The management server may be further configured to determine exercise equipment to use next for exercise based on an exercise equipment list of pieces of exercise equipment with which the user needs to exercise, distance information between the user and each piece of exercise equipment, and mode information of each exercise equipment and provide at least one of the user terminal, the exercise equipment, and the entry device with information regarding the exercise equipment to use next for exercise.

The management server may be further configured to determine whether or not exercise equipment in a standby mode is present in the exercise equipment list and determine, as the exercise equipment to use next for exercise, exercise equipment closest to a distance between the user and the exercise equipment that is in the standby mode.

The user terminal may include at least one of a mobile terminal, a wearable device, an RFID card, an NFC card, and a head mounted display.

A method of operating a sports center system, according to an embodiment, includes: performing authentication by using biometric information of a user; granting activation authority over exercise equipment to a user terminal corresponding to the user who is successfully authenticated; and switching a mode of the exercise equipment to an exercise mode when the user terminal is determined to have entered a particular area of exercise equipment that is in a standby mode.

The method may further include controlling an entry device so that the user who is successfully authenticated enters a sports center, wherein the granting of the activation authority includes granting the activation authority over the exercise equipment to the user terminal when the user who has successfully authenticated is determined to enter the sports center through the entry device.

The method may further include terminating the granting of the activation authority to the user terminal when the user is determined to have exit the sports center through the entry device.

The method may further include terminating the granting of the activation authority to the user terminal when a certain period of time elapses after granting the activation authority.

The method may further include: determining exercise equipment that is in a standby mode in an exercise equipment list for pieces of exercise equipment with which the user needs to exercise; determining, as exercise equipment to use next for exercise, exercise equipment closest to a distance between the user and the exercise equipment that is in the standby mode; and providing information regarding the exercise equipment to use next for exercise, through at least one of the user terminal, the entry device, and the exercise equipment.

Advantageous Effects

A sports center system and an operation method thereof, according to an embodiment, may increase accuracy of membership authentication through biometric authentication for entering and exiting a sports center and reduce costs caused by membership authentication through equipment authentication when exercise equipment is in use.

The sports center system and the operation method thereof, according to an embodiment, may provide an effective exercise movement line to a user in a sports center, on the basis of a list of pieces of exercise equipment for the user, a location of the user, a state of the exercise equipment, and the like.

BEST MODE

Mode for Invention

Regarding the terms in the present disclosure, the general terms which are currently and widely used are selected in consideration of functions of structural elements in the present disclosure. However, meanings of the terms may be changed according to intention, a judicial precedence, the appearance of a new technology, and the like. In addition, in certain cases, terms which may be arbitrarily selected by the applicant in particular cases. In such a case, the meaning of the terms will be described in detail at the corresponding portion in the description of the present disclosure. Therefore, the terms used in the present disclosure should be defined based on the meanings of the terms and the descriptions provided herein.

Although the terms first, second, etc. may be used herein to describe various elements or components, these elements or components should not be limited by these terms. These terms are only used to distinguish one element or component from another.

Figure 1:
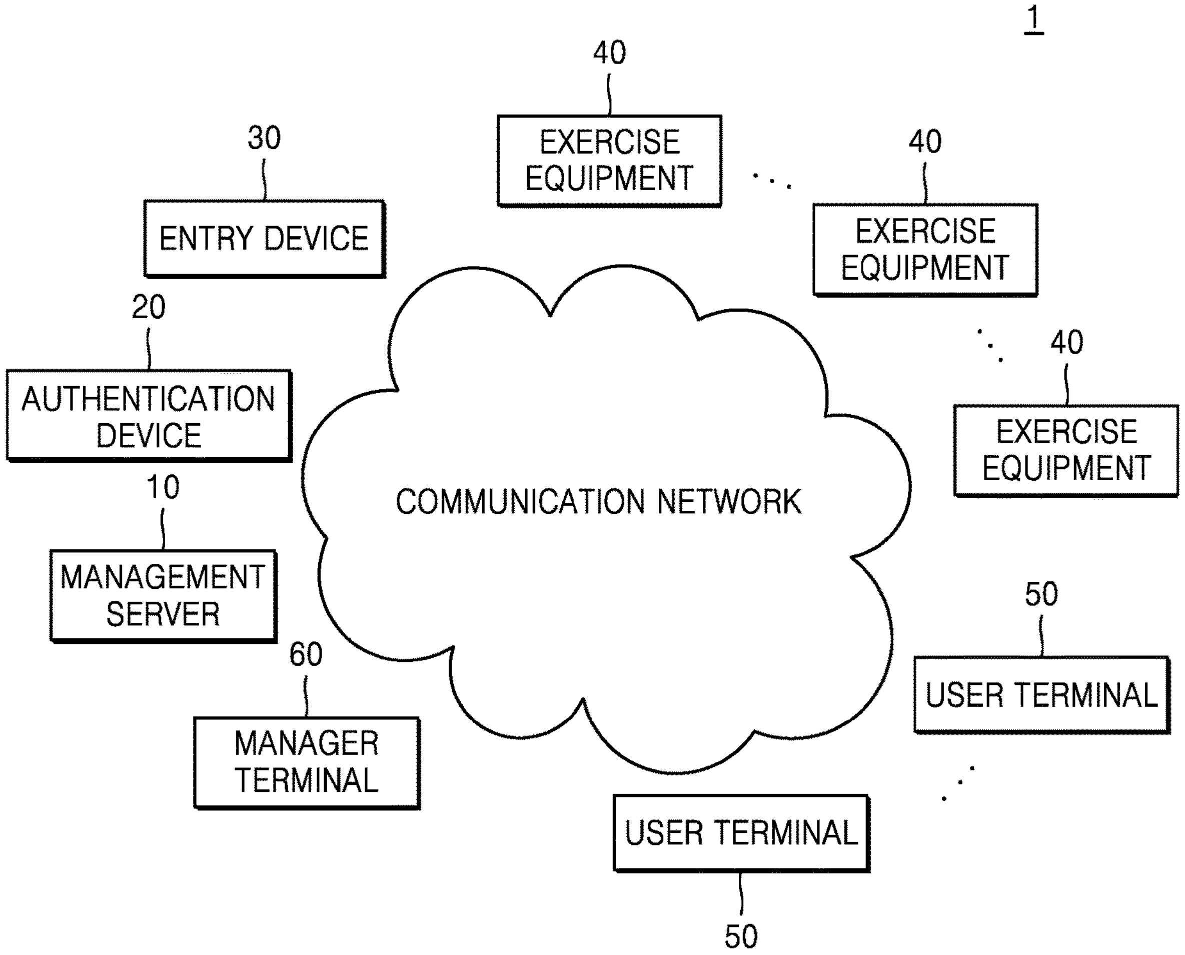
FIG. 1 is a diagram schematically illustrating a system for operating a sports center, according to an embodiment.

FIG. 1 is a diagram schematically illustrating a system 1 for operating a sports center, according to an embodiment. Referring to FIG. 1, the system 1 may include a management server 10 connected via a network, an authentication device 20, an entry device 30, exercise equipment 40, a user terminal 50, and a manager terminal 60. In addition, the system 1 may further include a payment server and a content server, which are linked to the management server 10.

The network may be implemented as various types of wired and wireless networks such as a local area network (LAN), a wide area network (WAN), a value added network (VAN), a personal area network (PAN), a mobile radio communication network, or a satellite communication network.

The management server 10 may also be connected to the authentication device 20, the entry device 30, the exercise equipment 40, the user terminal 50, and the manager terminal 60 through the network, to transmit and receive data, store an exercise schedule of a user, a list of pieces of exercise equipment, and the like according to a request of the manager terminal 60, store the result of exercise by the user and the like from information received from the user terminal 50 or the exercise equipment 40, and provide the result of the exercise to the manager terminal 60 or the user terminal 50 according to a request of the manager terminal 60 or the user terminal 50.

In addition, the management server 10 may also control the exercise equipment 40 and the in the sports center according to a request of the user terminal 50 or generate exercise history, calorie information corresponding to the result of the exercise, and the like by using the result of the exercise received from the exercise equipment 40.

The management server 10 may be an operation server of an Internet site. The management server 10 may operate a dedicated app and/or web program connected to the entry device 30, the exercise equipment 40, the user terminal 50, and the manager terminal 60 or perform a function of supporting the same. In addition, the management server 10 may perform a function of supporting an interface needed to establish an application, such as an application programming interface (API), on a web/app so that an application for implementing a content platform of a digital information display may run.

The authentication device 20 may authenticate the user by using biometric information of the user. The authentication device 20 may include a camera, an infrared sensor, or the like, which is a sensor that detects the biometric information of the user, such as a face, a fingerprint, an iris, a blood vessel, and a voice of the user. The biometric information of the user may not be easily stolen and thus increase accuracy of authentication.

The authentication device 20 may identify whether or not the user is a registered user, according to whether or not the biometric information of the user acquired from the sensor is the same as the information received from the management server 10. The authentication device 20 authenticates the user, but is not limited thereto. The authentication device 20 may detect the biometric information and transmit the detected biometric information to the management server 10, and the management server 10 may perform user authentication and transmit the result thereof to the authentication device 20. When the authentication is successful, the management server 10 or the authentication device 20 may grant, to the user terminal 50 corresponding to the user who is successfully authenticated, authority to activate at least one of the entry device 30 and the exercise equipment 40.

The entry device 30 is a terminal arranged in the sports center to manage entry or exit of the user. The entry device 30 may determine whether or not the user enters, according to the number of persons accommodated in the sports center, whether or not the user makes a reservation, and the like and transmit the result thereof to the management server 10 or the user terminal 50. In addition, the entry device 30 may not only allow entry, but also provide the user who requests entry with information regarding the exercise equipment 40 with which exercise needs to be taken.

The exercise equipment 40 may include an exercise main body that is implemented as weight training equipment or a treadmill and moves according to movement of the user. In addition, the exercise equipment 40 may provide an exercise guidance to the user under control by the management server 10 and transmit the result of exercise by the user to the management server 10. The exercise equipment 40 may be set in various modes according to a manipulation by the user or control by management server 10.

The user terminal 50 is a terminal registered in the management server 10 to be provided with an exercise management service and is a terminal capable of transmitting and receiving data by accessing the management server 10, the entry device 30, and the exercise equipment 40 through a wired or wireless network. The user terminal 50 may be a mobile terminal, a radio frequency identification (RFID) card, a near field communication (NFC) card, a smartphone, a tablet PC, a personal digital assistant (PDA), a media player, a global positioning system (GPS) device, an e-book terminal, a wearable device, other mobile and non-mobile computing devices, a smart band, or a head mounted display, but the present disclosure is not limited thereto. Here, the user terminal 50 may be a device that a user provided with an exercise management service may carry inside the sports center.

The manager terminal 60 is a terminal registered in the management server 10 to provide the exercise management service and is a terminal capable of transmitting and receiving data by accessing the management server 10 through the wired or wireless network. The manager terminal 60 may be a smartphone, a PC, a tablet PC, a notebook, a smart TV, a mobile phone, a personal digital assistant (PDA), a laptop, a media player, a global positioning system (GPS) device, an e-book terminal, a digital broadcasting terminal, a navigation system, a digital camera, a wearable device, and other mobile or non-mobile computing devices, but the present disclosure is not limited thereto. Here, the manager terminal 60 may refer to not only a terminal owned by a person registered as a manager in the management server 10 but also a random terminal through which the registered manager may access and log into the management server 10.

Figure 2:
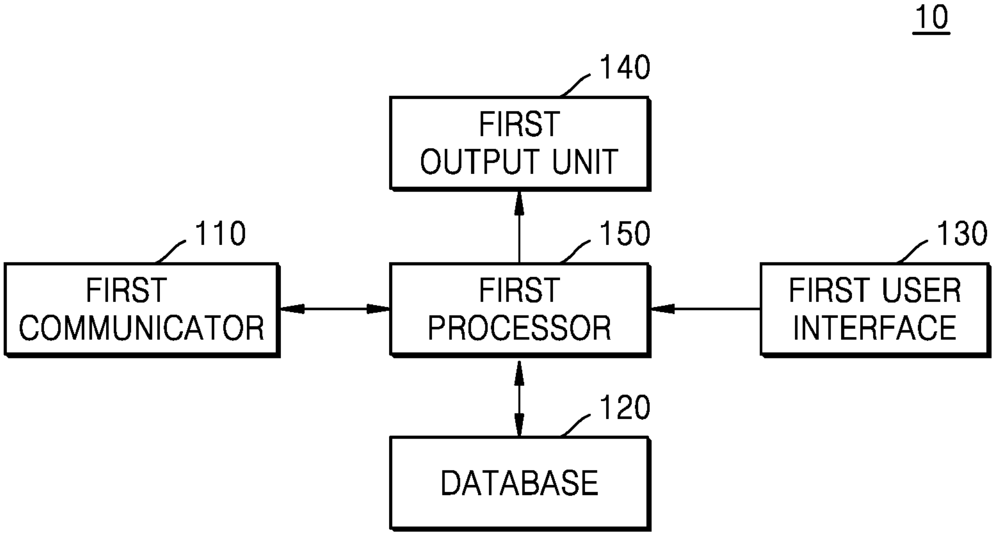
FIG. 2 is a block diagram illustrating a management server according to an embodiment.

FIG. 2 is a block diagram illustrating a management server 10 according to an embodiment. Referring to FIG. 2, the management server 10 may include, for example, a first communicator 110 that communicates with external terminals, the authentication device 20, the entry device 30, the exercise equipment 40, a mirror display, the user terminal 50, the manager terminal 60, and the like, through a network, a database 120 that stores information regarding an exercise program for a user, exercise history of the user, a list of entries into a sports center, and a mode of the exercise equipment 40, and the like, a first user interface 130 that receives, as an input, a command of the user such as a manager managing the management server 10, a first output unit 140 that displays or notifies a state of the sports center, and a first processor 150 that performs an overall function of the management server 10. The first processor 150 may generate the exercise program for the user or manage a use status of the sports center and set the mode of the exercise equipment 40, according to a request of the manager terminal 60.

Although not illustrated in the drawings, the authentication device 20, the entry device 30, the user terminal 50, and the manager terminal 60, may also include communicators, storage units, user interfaces, processors, and the like.

Figure 3:
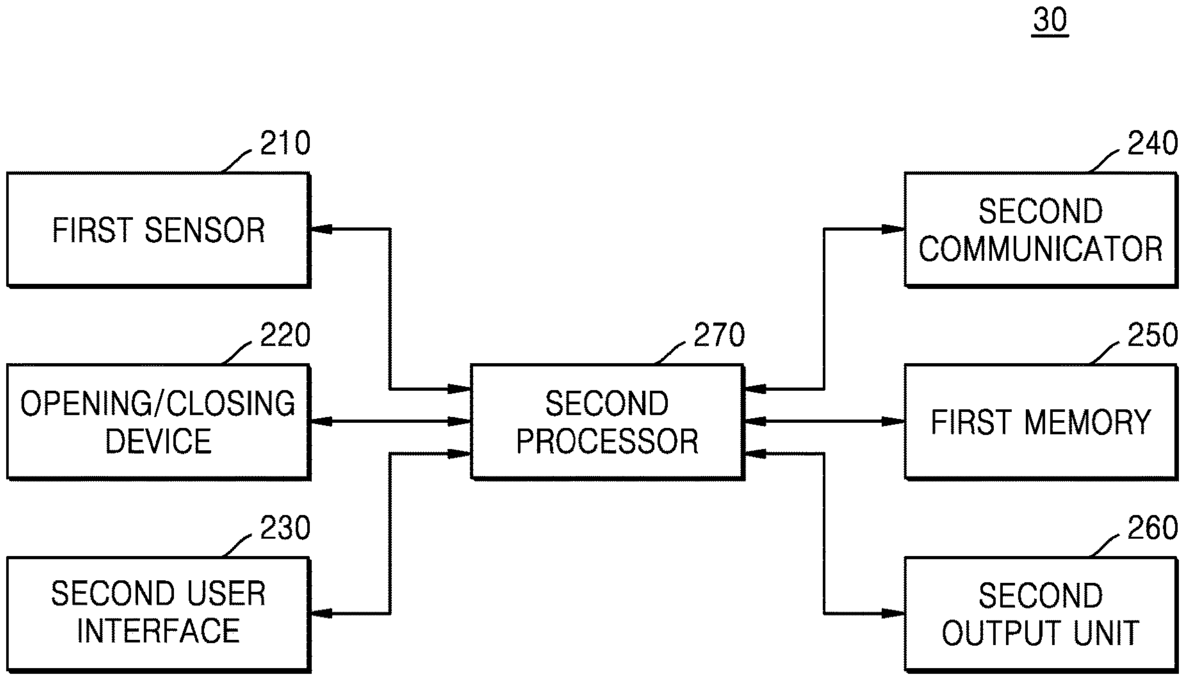
FIG. 3 is a block diagram illustrating an entry device according to an embodiment.

FIG. 3 is a block diagram illustrating an entry device 30 according to an embodiment. The entry device 30 according to an embodiment may include a first sensor 210, an opening/closing device 220, a second user interface 230, a second communicator 240, a first memory 250, a second output unit 260, and a second processor 270.

The first sensor 210 may include a sensor that detects the user terminal 50. For example, the first sensor 210 may include an RFID reader, an NFC reader, or the like. The detection of the user terminal 50 may be performed through a third communicator 330 of FIG. 4 without a separate sensor.

The opening/closing device 220 may be opened or closed under control by the second processor 270. The user may enter and exit a sports center through the opening/closing device 220. For example, when the user terminal 50 detected by the first sensor 210 is determined to be the user terminal 50 via which the user is successfully authenticated, the second processor 270 may transmit a control signal for opening the opening/closing device 220 to the opening/closing device 220. When the opening/closing device 220 is opened and the user enters the sports center, the opening/closing device 220 may transmit the result thereof to the second processor 270 and may be closed. Alternatively, when the user does not enter for a certain period of time after the opening/closing device 220 is opened, the opening/closing device 220 may transmit the result thereof to the second processor 270 and may be closed.

The opening/closing device 220 may be opened when receiving a user command via which the user requests opening inside the sports center, and when the user exits the sports center, the opening/closing device 220 may transmit the result thereof to the second processor 270 and then may be closed. When the user does not exit for a certain period of after the opening/closing device 220 is opened, the opening/closing device 220 may transmit the result thereof to the second processor 270 and may be closed.

The second user interface 230 may receive, as an input, a user command such as the user or a manager and transmit the result thereof to the second processor 270. The second communicator 240 may communicate with external devices, e.g., the management server 10, the exercise equipment 40, the user terminal 50, the manager terminal 60, and the like. The second communicator 240 may communicate with the management server 10 through various types of wired and wireless networks. The second communicator 240 may communicate with the exercise equipment 40, the user terminal 50, and the manager terminal 60 through a short-range communication network such as a local area network (LAN) or a personal area network (PAN). Therefore, the entry device 30 may be prevented from being controlled by an external device other than the management server 10. However, the present disclosure is not limited thereto. In some cases, the second communicator 240 may also perform remote communication with the manager terminal 60.

The second output unit 260 may provide output information. The output information according to an example may be user information, user exercise information, or information for guiding exercise by the user. As an example, the second output unit 260 may include a display for displaying the output information.

In FIGS. 1 and 3, the authentication device 20 and the entry device 30 are described as separate devices. However, the present disclosure is not limited thereto. The authentication device 20 may be a component of the entry device 30.

Figure 4:
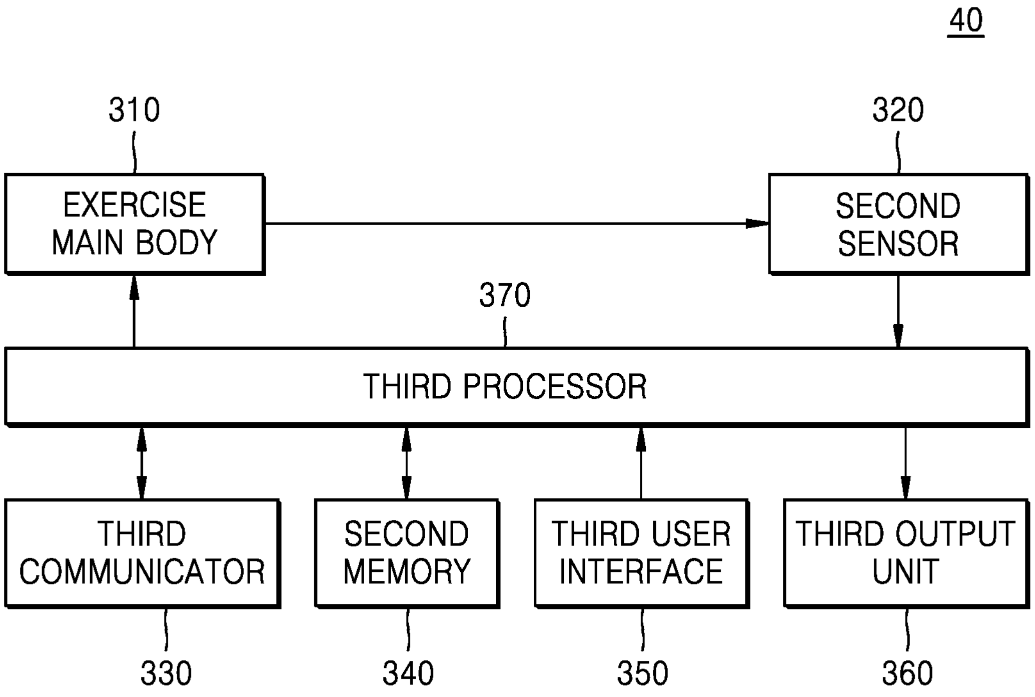
FIG. 4 is a block diagram illustrating exercise equipment according to an embodiment.

FIG. 4 is a block diagram illustrating exercise equipment 40 according to an embodiment. The exercise equipment 40 according to an embodiment may be aerobic exercise equipment or anaerobic exercise equipment. For example, the exercise equipment 40 may be aerobic exercise equipment such as a treadmill, a bicycle, an elliptical, or stair exercise equipment, or anaerobic exercise equipment such as chest press, shoulder press, arm curl, lat pulldown, peck deck fly, city draw, low pull chinning dipping, leg curl, leg extension, leg press, inner thigh, outer thigh, total hip, torso back extension, or up abdominal.

The exercise equipment 40 may include the exercise main body 310, a second sensor 320, a third communicator 330, a second memory 340, a third user interface 350, a third output unit 360, and a third processor 370.

The exercise main body 310 is physical exercise equipment that moves according to movement of a user. The exercise main body 310 according to an example may add, reduce, or maintain a load according to a set exercise level. The exercise main body 310 may vary according to the type of exercise equipment 40.

The second sensor 320 may detect movements of components included in the exercise main body 310 and transmit the result thereof to the third processor 370. The second sensor 320 described above may include a laser sensor, a motion sensor, a gyro sensor, or the like.

Alternatively, the second sensor 320 may include a sensor that detects the user terminal 50. For example, the second sensor 320 may include an RFID reader, an NFC reader, or the like. The detection of the user terminal 50 may be performed through the third communicator 330 without a separate sensor.

The third communicator 330 may communicate with an external device, for example, the management server 10, the entry device 30, another exercise equipment 40, the user terminal 50, the manager terminal 60, or the like. The third communicator 330 may communicate with the management server 10 through various types of wired and wireless networks such as a local area network (LAN), a wide area network (WAN), a value added network (VAN), a personal area network (PAN), a mobile radio communication network, or a satellite communication network. In addition, the third communicator 330 may communicate with the entry device 30, user terminal 50, and manager terminal 60 through a short-range communication network such a local area network (LAN) or a personal area network (PAN). Therefore, the exercise equipment 40 may be prevented from being controlled by an external device other than the management server 10. However, the present disclosure is not limited thereto. In some cases, the third communicator 330 may also perform remote communication with the manager terminal 60.

The second memory 340 may store various types of information used by at least one component (e.g., the third processor 370 or the second sensor 320) included in the exercise equipment 40. The information described above may include, for example, software (e.g., a program) and input data or output data for a command related thereto. As an example, the second memory 340 may include an adjustment exercise range or a threshold exercise range that is predetermined according to user information.

The third user interface 350 may receive a command or data to be used for the exercise equipment 40 from the outside of the exercise equipment 40 (e.g., the user). The third user interface 350 may include, for example, a microphone, a mouse, or a keypad. As an example, the user may input the user information through the third user interface 350. For example, the user information may include one or more of a name, age, gender, height, weight, and exercise history of the user.

The third output unit 360 may provide the output information. The output information according to an example may be user information, user exercise information, or information for guiding exercise by the user. As an example, the third output unit 360 may include a display for displaying the output information. In addition, the third output unit 360 may be physically or electrically connected to the exercise main body 310. For example, the display may be installed on a frame structure of the exercise main body 310. However, the present disclosure is not limited thereto, and the display may be connected to receive a certain signal from the exercise main body 310 even when arranged to be spaced apart from the exercise main body 310, including a communicator.

The third processor 370 may generally control the exercise equipment 40, and control the third communicator 330 to communicate with an external device. The third processor 370 may execute, for example, software (e.g., a program) to control at least one another component (e.g., a hardware or software component) connected to the third processor 370 and perform various types of data processing or operations. According to an embodiment, as at least a portion of data processing or operation, the third processor 370 may load a command or data received from another component (e.g., the second sensor 320 or the third communicator 330) into a volatile memory in the second memory 340, process the command or data stored in the volatile memory, and store result data thereof in a nonvolatile memory in the second memory 340.

Figure 5:
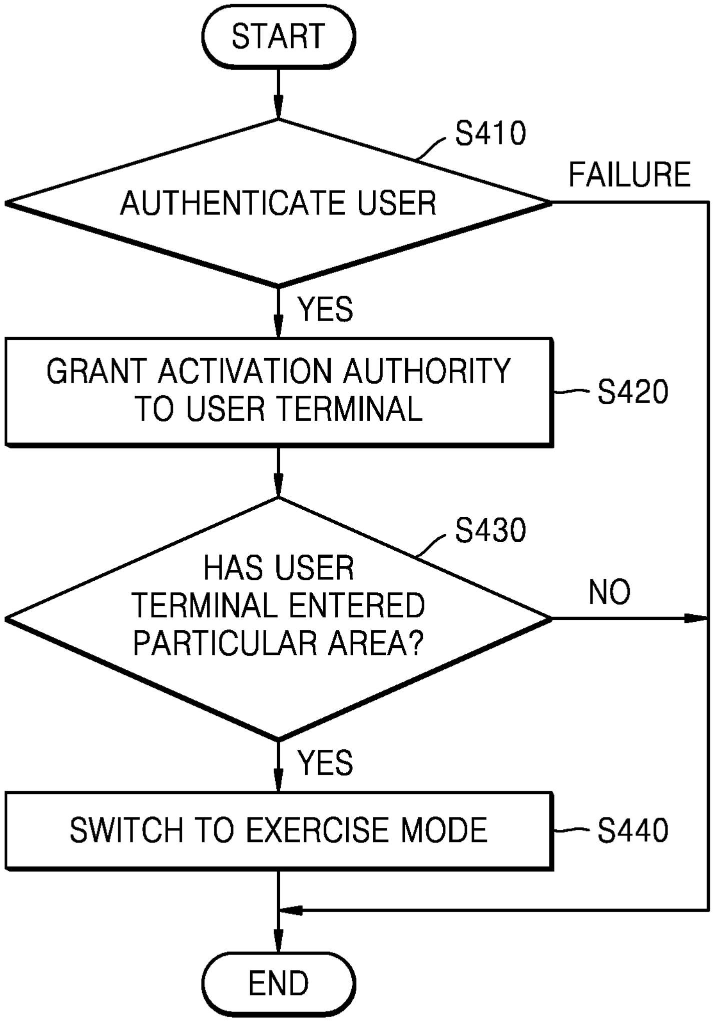
FIG. 5 is a flowchart illustrating a method of operating a sports center system in relation to user authentication, according to an embodiment.

FIG. 5 is a flowchart illustrating a method of operating a sports center system in relation to user authentication, according to an embodiment.

In operation S410, the authentication device 20 may authenticate a user. For example, the user may request user authentication by accessing the authentication device 20 and approaching a part of the body of the user to a sensor. The sensor of the authentication device 20 may acquire biometric information of the user and authenticate the user on the basis of whether or not the acquired biometric information is the same as pre-registered biometric information.

The biometric information may include information regarding at least one of an iris, a blood vessel, a fingerprint, a face, and a voice. The fingerprint may include about 40 identifiable features such as split points, connected points, and end points of the fingerprint and may be detected by an infrared sensor. The iris may relate to a comb-patterned muscle pattern that controls pupil dilation and may be detected by an infrared camera.

The voice may include features of voice that vary according to pitch and tone of the voice, and nasal and oral shapes and may be detected by a microphone, and the face may include features such as a contour of the face, a distance and position of the eyes, nose, and mouth, and a height of cheekbones and nose and may be detected by an infrared sensor or a 3D camera. The blood vessel may include a unique vascular shape, and an afterimage of the blood vessel may be identified with infrared rays by the infrared sensor.

The biometric information is not limited thereto, and may correspond to biometric information used in the present invention, which may correspond to information related to a living body having features that are 1) universal for everyone, 2) unique to each person, 3) permanent and unchangeable, and 4) collectable for being easy to acquire and quantifiable by a sensor.

Only a legitimate user may use a sports center by using user authentication using the biometric information when using a sports center.

The authentication device 20 authenticates the user by using the biometric information of the user, but is not limited thereto. The management server 10 may perform the user authentication. For example, the authentication device 20 may transmit the acquired biometric information of the user to the management server 10. In addition, the management server 10 may perform the user authentication by comparing the acquired biometric information of the user with the pre-registered biometric information of the user and transmit the result thereof to the authentication device 20.

When the user is successfully authenticated, in operation S420, the management server 10 may grant, to the user terminal 50 corresponding to the authenticated biometric information, activation authority to activate pieces of exercise equipment 40 arranged within the sports center. The management server 10 may pre-register biometric information for each user and information regarding the user terminal 50 as a type of metadata. The management server 10 may acquire information regarding the user terminal 50 corresponding to the biometric information by using the metadata described above and grant the activation authority to activate the exercise equipment 40 to the user terminal 50 corresponding to the biometric information through the first communicator 110 on the basis of the acquired information regarding the user terminal 50. When the activation authority is granted to the user terminal 50, the user may adjust a mode of the exercise equipment 40 by using the user terminal 50.

For example, when the user terminal 50 enters a certain area of the exercise equipment 40 in operation S430, the mode of the exercise equipment 40 may be switched to an exercise mode in operation S440.

As described above, the user may be authenticated by using the biometric information of the user, and thus, the user may be more stably authenticated. The exercise equipment 40 authenticates a device by using a user terminal, and thus, an authentication device for authenticating biometric information does not need to be installed on each exercise equipment 40. Therefore, costs may be reduced.

After the user is completely authenticated, an activation authority to activate exercise equipment may be granted to a user terminal corresponding to the user, but the present disclosure is not limited thereto. Activation authority to activate exercise equipment may be granted to a user terminal corresponding to a user who is authenticated and enters a sports center.

Figure 6:
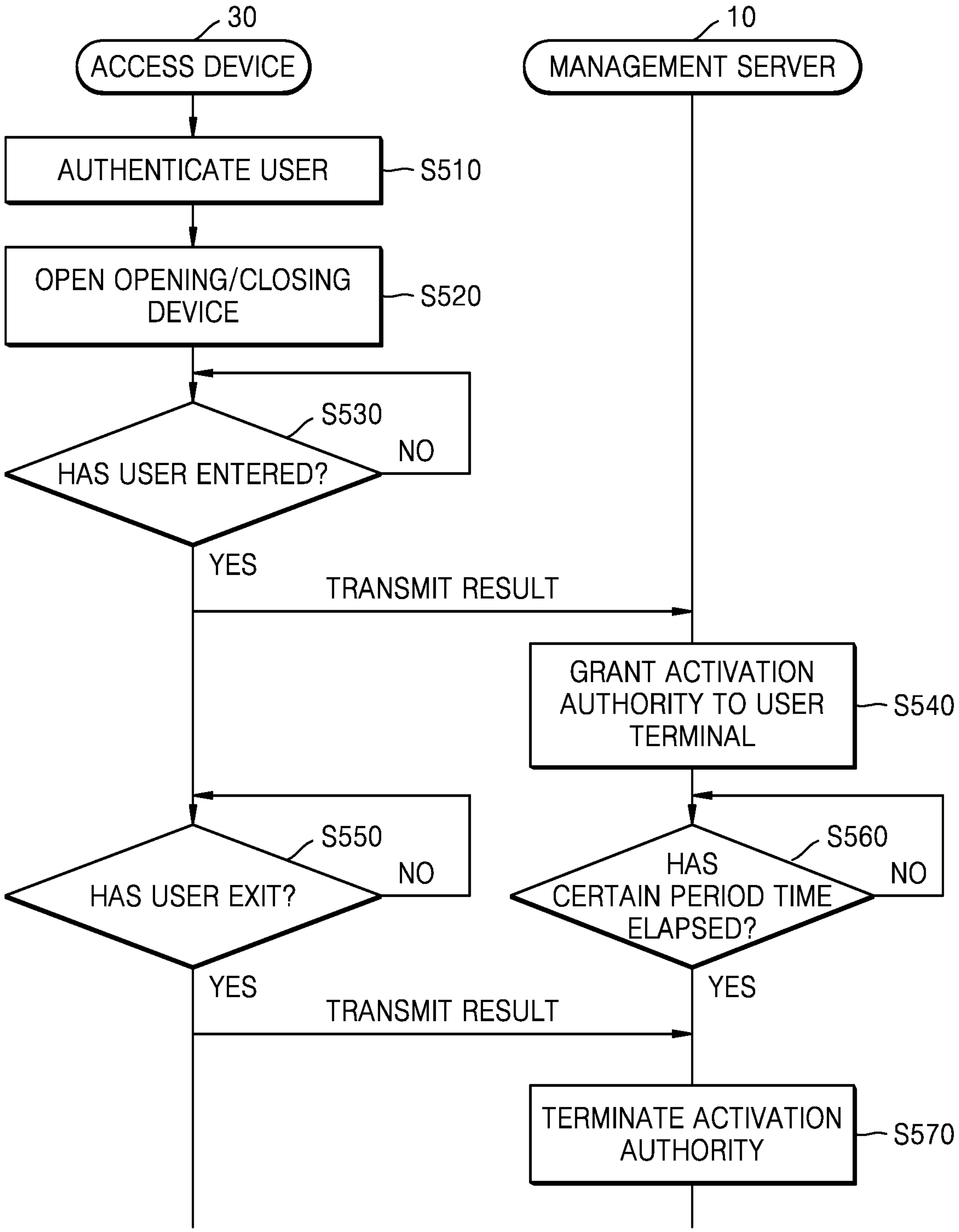
FIG. 6 is a flowchart illustrating a method of operating a sports center system in relation to access to and exit from a sports center, according to an embodiment.

FIG. 6 is a flowchart illustrating a method of operating a sports center system in relation to access to and exit from a sports center, according to an embodiment. Hereinafter, the authentication device 20 may be a component of the entry device 30. However, the present disclosure is not limited thereto. The authentication device 20 may be a different device from the entry device 30, and a user may be authenticated only by the authentication device 20. In addition, the entry device 30 may open and close an opening/closing device 220 by authenticating the user terminal 50 similar to the exercise equipment 40.

In operation S510, the entry device 30 may perform user authentication. For example, the user may request the user authentication by accessing the entry device 30 and approaching a part of the body of the user to the first sensor 210. The first sensor 210 of the entry device 30 may acquire biometric information of the user and transmit the biometric information to the second processor 270, and the second processor 270 may perform the user authentication by comparing the biometric information of the user received from the first sensor 210 with pre-registered biometric information.

The entry device 30 performs the user authentication by using the biometric information of the user, but is not limited thereto. The management server 10 may also the user authentication. For example, the second processor 270 of the entry device 30 may transmit the biometric information of the user received from the first sensor 210 to the management server 10 through the second communicator 240. In addition, the management server 10 may perform the user authentication by comparing the biometric information of the user acquired by the first sensor 210 with the pre-registered biometric information of the user and transmit the result thereof to the entry device 30.

When the user is completely authenticated, in operation S520, the second processor 270 of the entry device 30 may open the opening/closing device 220, so that the user may enter a sports center.

When the opening/closing device 220 is opened and the user enters the sports center in operation S530, the opening/closing device 220 transmits the result thereof to the second processor 270. In addition, when the user enters the sports center, the entry device 30 may transmit the result thereof to the management server 10.

In operation S540, the management server 10 may grant, to the user terminal 50 corresponding to the authenticated biometric information, activation authority to activate pieces of exercise equipment 40 arranged within the sports center. The management server 10 may pre-register biometric information for each user and information regarding the user terminal 50 as a type of metadata. The management server 10 may acquire information regarding the user terminal 50 corresponding to the biometric information by using the metadata described above and grant the activation authority to activate the exercise equipment 40 to the user terminal 50 corresponding to the biometric information through the first communicator 110 on the basis of the acquired information regarding the user terminal 50. When the activation authority is granted to the user terminal 50, the user may adjust a mode of the exercise equipment 40 by using the user terminal 50 described above. For example, when the user terminal 50 enters a certain area of the exercise equipment 40, the mode of the exercise equipment 40 may be switched to an exercise mode.

Meanwhile, a use time of the activation authority may also be pre-stored in the metadata. When the use time stored in the metadata elapses, the management server 10 may terminate the activation authority granted to the user terminal 50. When the activation authority is terminated, the mode of the exercise equipment 40 is not changed even when the user terminal 50 enters the certain area of the exercise equipment 40.

In addition, when determining, in operation S550, that the user exits through the opening/closing device 220, the entry device 30 may transmit the result thereof to the management server 10. The user may input, inside the sports center, a user command requesting exit through the second user interface 230 of the entry device 30. The second user interface 230 may transmit the user command to the second processor 270, and the second processor 270 may open the opening/closing device 220 according to the user command. When the opening/closing device 220 is opened and the user exits, the opening/closing device 220 may transmit the result thereof to the second processor 270, and the second processor 270 may transmit to the management server 10 through the second communicator 240 that the user exits.

In addition, in operation S570, the management server 10 may terminate the activation authority granted to the user terminal 50. Alternatively, when information regarding a user terminal corresponding to a user entering the sports center is stored in the first memory 250 of the entry device 30, the second processor 270 of the entry device 30 may also communicate with the user terminal 50 to terminate the activation authority granted to the user terminal 50.

As described above, the user may be authenticated by using the biometric information of the user, and thus, the user may be more stably authenticated. Therefore, only a legitimate user may enter and exit the sports center.

Figure 7:
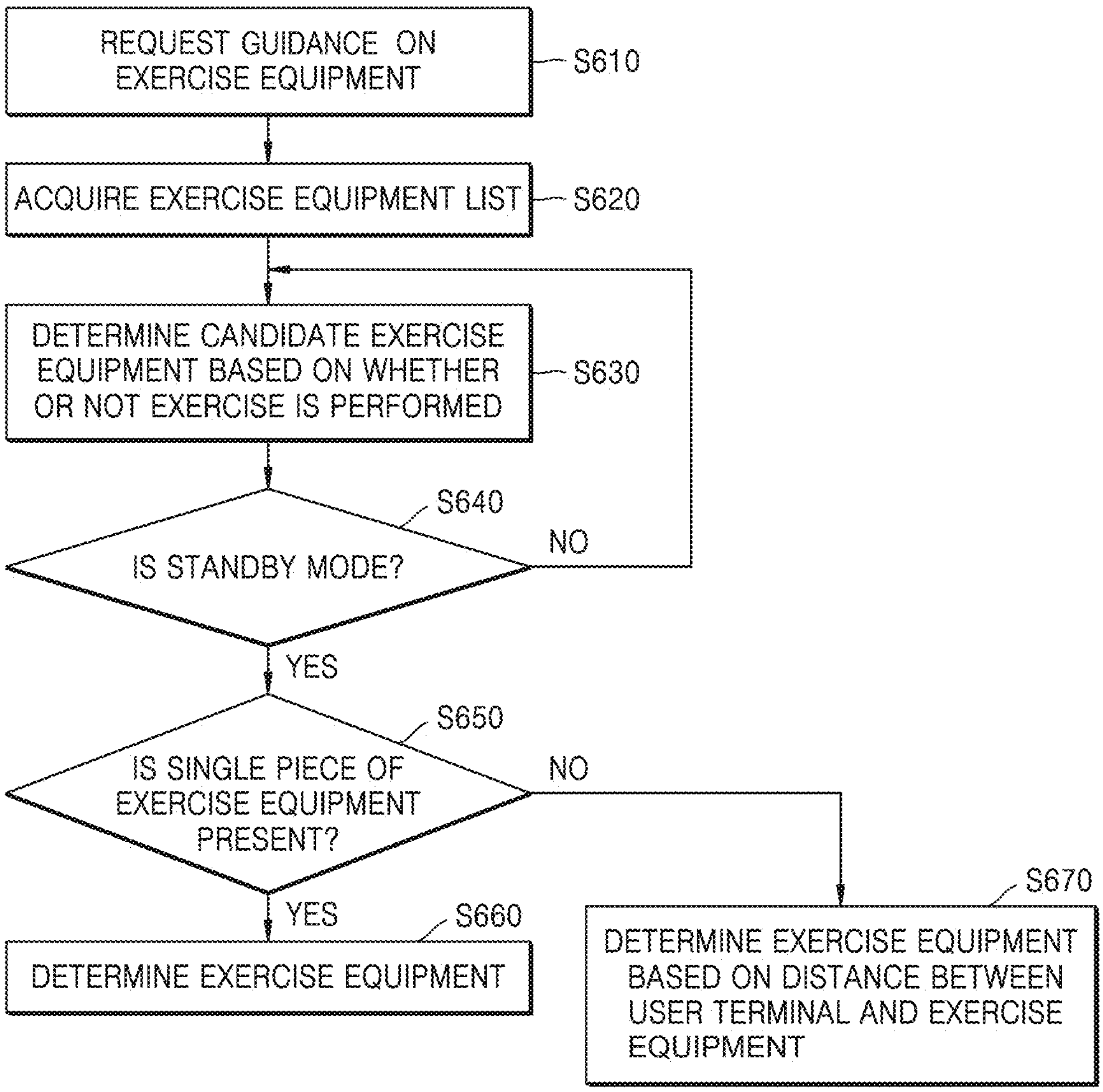
FIG. 7 is a flowchart illustrating a method of operating a sports center system for guiding exercise equipment for taking next exercise, according to an embodiment.

FIG. 7 is a flowchart illustrating a method of operating a sports center system for guiding exercise equipment 40 for a next exercise, according to an embodiment.

In operation S610, the first processor 150 of the management server 10 may be requested from an external device through the first communicator 110 to guide the exercise equipment 40. The external device may be the user terminal 50, the entry device 30, or the exercise equipment 40. For example, after allowing the user to enter, the entry device 30 may request the management server 10 to guide the exercise equipment 40 to the user. Alternatively, the user terminal 50 may request to guide the exercise equipment 40 after entering the sports center, and the exercise equipment 40 whose exercise mode ends or is scheduled to end may request the management server 10 to guide next exercise equipment 40.

When receiving the request for the guidance on the exercise equipment 40, in operation S620, the first processor 150 of the management server 10 may acquire a list of pieces of exercise equipment 40 for the user. The first processor 150 of the management server 10 may read, from the database 120, the list of pieces of exercise equipment 40 corresponding to user information received from an external device. The database 120 pre-stores a list of pieces of exercise equipment 40 matched to information regarding the user terminal 50. When receiving, from the external device, that the user completes exercise, the first processor 150 of the management server 10 may update, in the list of pieces of exercise equipment 40, whether or not the exercise is performed, and the like.

In operation S630, the first processor 150 of the management server 10 may determine candidate exercise equipment 40 in the list of pieces of exercise equipment 40 based on whether not the exercise is performed. Here, the candidate exercise equipment 40 may refer to exercise equipment 40 with which exercise is not performed, in the list of pieces of exercise equipment 40. The list of pieces of exercise equipment 40 read from the database 120 also include together whether or not the exercise is performed.

The first processor 150 of the management server 10 may determine, as the candidate exercise equipment 40, exercise equipment 40 with which exercise is not performed, in the list of pieces of exercise equipment 40. Here, a criterion for not performing may be determined and stored by a user or a manager. For example, whether or not the exercise equipment 40 is used may be reset whenever entering and exiting the sports center. In other words, when the user enters the sports center, the list of all pieces of exercise equipment 40 is reset to unused, so that the user may take exercise with exercise equipment 40 included in the list of pieces of exercise equipment 40. However, the present disclosure is not limited thereto. A reset period may also be set, for example, at intervals of two days. Therefore, when two days elapse, the exercise equipment 40 in the list of pieces of exercise equipment 40 may also be reset to unused. The same may be useful when the user wants to divide and perform several types of exercise within a certain period of time (e.g., two days). In addition, whenever a request of a user or a manager is received, the management server 10 may also reset the list of pieces exercise equipment 40 to unused.

When a plurality of pieces of exercise equipment 40 are not used, the management server 10 may determine, as exercise equipment 40 to be guided, exercise equipment 40 having a high priority in the list of pieces of exercise equipment 40. When setting the list of pieces of exercise equipment 40, the user or the manager may include exercise equipment 40 having a high priority, i.e., exercise equipment 40 with which exercise needs to be first taken, at the top of the list, and the first processor 150 may determine the exercise equipment 40 having a high priority based on display order of the list of pieces of exercise equipment 40.

In operation S640, the first processor 150 of the management server 10 may determine whether or not the candidate exercise equipment 40 in operation S630 is in a standby mode.

When the candidate exercise equipment 40 does not include exercise equipment 40 that is in the standby mode, the management server 10 may determine, in the list of pieces of exercise equipment 40, another exercise equipment 40 with which exercise is not performed. For example, when a treadmill and weight equipment in the list of pieces of exercise equipment 40 are exercise equipment 40 with which exercise is not performed and all of the exercise equipment 40 of treadmills arranged in the sports center are not in the standby mode, the management server 10 may determine whether or not the exercise equipment 40 of the weight equipment is in the standby mode.

Meanwhile, when all of pieces of the candidate exercise equipment 40 are not in the standby mode, the management server 10 may notify the user through an external device (e.g., the entry device 30, the user terminal 50, and another exercise equipment 40) that the exercise equipment 40 may not be used. Then, the user may wait, or may request the management server 10 through the external device to guide the exercise equipment 40 that is not included in the list of pieces of exercise equipment 40.

Alternatively, the management server 10 may recommend exercise equipment 40 equivalent to unused exercise equipment 40 while notifying the user through an external device (e.g., the entry device 30, the user terminal 50, or another exercise equipment 40) that the exercise equipment 40 may not be used. For example, when all of the exercise equipment 40 of treadmills are not in the standby mode, the management server 10 may recommend, to the user, a bicycle that is another exercise equipment 40 for aerobic exercise.

When the candidate exercise equipment 40 is in the standby mode (S640—Yes) and a single piece of exercise equipment 40 is in the standby mode (S650—Yes), the first processor 150 of the management server 10 may finally determine the exercise equipment 40 described above as exercise equipment 40 to be guided.

In addition, the management server 10 may provide the user with information regarding the exercise equipment 40 to be guided through an external device, e.g., the entry device 30, the user terminal 50, or the exercise equipment 40. For example, the management server 10 may display, in the form of text or an image, information regarding exercise equipment 40 to use next for exercise, through the second output unit 260 of the entry device 30, an output unit of the user terminal 50, or a third output unit of exercise equipment 40 with which current exercise ends.

The management server 10 may control the exercise equipment 40, which is determined as the exercise equipment 40 to use next for exercise, to output a guidance indicator. The guidance indicator may be an indicator that guides movement of the user by easily identifying exercise equipment 40 with which the user needs to exercise. For example, each exercise equipment 40 may include a display indicating a mode of the exercise equipment 40. The display may have a color that varies according to a mode. For example, when in an exercise mode, the display may display white, and when in the standby mode, the display may display green. In addition, the display may display the guidance indicator in red or with a green flashing light.

When a plurality of pieces of exercise equipment 40 are in the standby mode (S650—No), in operation S670, the first processor 150 of the management server 10 may determine the exercise equipment 40 on the basis of a distance between the user terminal 50 and the exercise equipment 40. For example, the management server 10 may determine, as exercise equipment 40 to use next for exercise, exercise equipment 40 closest to the user terminal 50 from among the plurality of pieces of exercise equipment 40.

By providing exercise equipment 40 to use next for exercise, the management server 10 may increase the convenience of exercise in which the user may sequentially exercise according to a guidance of the management server 10. In addition, the exercise equipment 40 to use next for exercise may be determined and guided on the basis of a distance between a location of the user, i.e., a location of the user terminal 50, and the exercise equipment 40, and thus, an exercise movement line of the user may be minimized.

The exercise equipment 40 to use next for exercise is determined on the basis of a distance between the user terminal 50 and the exercise equipment 40, but is not limited thereto. The exercise equipment 40 to use next for exercise may be determined on the basis of an entrance of the sports center and a distance between a changing room and the exercise equipment 40. For example, the management server 10 may also determine the exercise equipment 40 to use next for exercise so that a movement line becomes closer to the changing room when the exercise equipment 40 is used.

Figure 8:
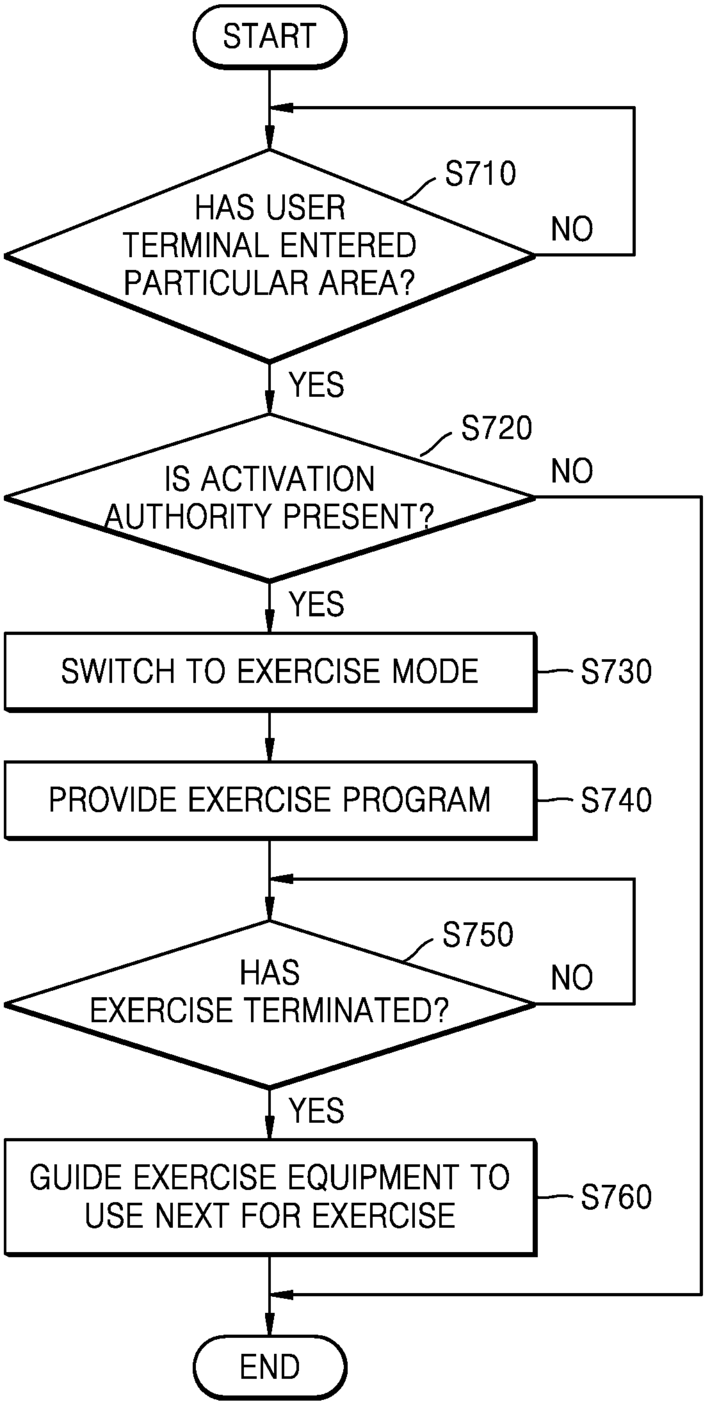
FIG. 8 is a flowchart illustrating a method of operating a sports center system for exercise equipment to provide an exercise program, according to an embodiment.

FIG. 8 is a flowchart illustrating a method of operating a sports center system for exercise equipment 40 to provide an exercise program, according to an embodiment.

Referring to FIG. 8, in operation S710, the exercise equipment 40 may determine, in a standby mode state, whether or not the user terminal 50 enters a particular area. The exercise equipment 40 may operate in various modes. For example, the exercise device 40 may operate in a locked mode, a standby mode, and an exercise mode.

The exercise mode is a mode in which the exercise main body 310 of the exercise equipment 40 moves according to movement of a user or moves according to an exercise program. The exercise mode may be set by a manipulation of the user. For example, a user command for switching to the exercise mode may be input through the third user interface 360 of the exercise device 40, or a request to switch to the exercise mode may be received from the user terminal 50 or the like.

The standby mode may refer to a mode in which the exercise main body 310 does not move but may be switched to the exercise mode by a user manipulation or the like. The exercise main body 310 does not move in the standby mode, but is not limited thereto. Even when moving in the standby mode state according to the movement of the user, the exercise main body 310 may not guide the exercise program to the user or may not store and transmit the result of exercise by the user. When the exercise main body 310 moves by the movement of the user in the standby mode state, the exercise equipment 40 may output, through the third output unit 370, an indicator requesting to switch to the exercise mode. The exercise mode may be switched only when the exercise equipment 40 is in the standby mode.

The locked mode is a mode in which the exercise main body 310 does not move, and does not switch to the exercise mode even when a request to switch to the exercise mode is received by user manipulation or the like. Accordingly, the exercise main body 310 of the exercise equipment 40 may not move by the movement of the user. However, the present disclosure is not limited thereto. Even when moving according to the movement of the user in the locked mode state, the exercise main body 310 may not guide the exercise program to the user or may not store and transmit the result of exercise by the user. In addition, when the exercise main body 310 moves by the movement of the user in the locked mode state, the exercise equipment 40 may output, through the third output unit 370, an indicator requesting to stop exercise. Alternatively, when the user wants to move the exercise main body 310 in the locked mode, the third processor 370 may control a component of the exercise main body 310 so that the exercise main body 310 does not move.

The exercise mode may be set by a manipulation of the user (wherein, the manipulation of the user refers to a user command through the third user interface 350 or a user command received from the user terminal 50 through the third communicator 330), and the standby mode or the locked mode may be set by the management server 10.

The user carrying the user terminal 50 may access the exercise equipment 40 that is in the standby mode and then move the user terminal 50 into an area that may be detected by the second sensor 320 of the exercise equipment 40. For example, when the second sensor 320 is an RFID sensor, the user may activate an RFID module of the user terminal 50 and then approach the RFID module of the user terminal 50 into an area that may be detected by the RFID sensor. The second sensor 320 of the exercise equipment 40 may detect information regarding the user terminal 50 and apply the detected information to the third processor 370 of the exercise equipment 40, and the third processor 370 may confirm whether or not the user terminal 50 has activation authority.

For example, the management server 10 may grant code corresponding to the activation authority to the user terminal 50, and the third processor 370 may identify whether or not the detected user terminal 50 is granted the activation authority by identifying whether or not the detected user terminal 50 has the code. The exercise equipment 40 may transmit the detected information regarding the user terminal 50 to the management server 10 and request from the management server 10 whether or not the user terminal 50 is granted the activation authority, and the management server 10 may provide the exercise equipment 40 with information regarding whether or not the activation authority is present.

A system for a sports center according to an embodiment may perform authentication for activating the exercise equipment 40 through the user terminal 50, i.e., device authentication. The authentication for activating the exercise equipment 40 also increases costs for authentication for each exercise equipment 40 when user authentication, or biometric authentication is performed. The user who enters the sports center is a legitimate user, and thus, the exercise equipment 40 may authenticate the user and provide a program through equipment authentication which is relatively inexpensive.

When the activation authority is determined to be granted (S720—Yes), in operation S730, the exercise equipment 40 may switch to an exercise mode. When the user terminal 50 is determined to have the activation authority, the third processor 370 of the exercise equipment 40 may switch the mode to the exercise mode. Alternatively, when the management server 10 determines that the user terminal 50 has the activation authority, the management server 10 may switch the mode to the exercise mode under control by the management server 10.

In addition, in operation S740, the exercise equipment 40 may provide an exercise program to a user. When the user terminal 50 is determined to have the activation authority, the exercise equipment 40 may request the exercise program corresponding to the user terminal 50 from the management server 10. When the management server 10 reads the exercise program of the exercise equipment 40 matched to information regarding the user terminal 50 or user information, which is stored in the database 120 and transmits the exercise program to the exercise equipment 40, the exercise equipment 40 may acquire the exercise program. Alternatively, when the exercise equipment 40 inquires from the management server 10 whether or not the user terminal 50 has the activation authority, the management server 10 may also provide information regarding the exercise program corresponding to the user terminal 50 together with information regarding whether or not the activation authority is present when the user terminal 50 has the activation authority.

The exercise equipment 40 may provide an exercise guide so that the user may exercise according to the exercise program. For example, when the exercise equipment 40 is a treadmill, the exercise equipment 40 may be operated with an exercise time, a speed, and the like which are set according to the exercise program. The exercise equipment 40 may store the result of exercise by the user such as an exercise intensity, exercise time, and exercise amount of the user during an exercise mode period.

Meanwhile, in operation S750, the exercise mode of the exercise equipment 40 may be terminated. When the user completes the exercise according to the exercise program, the third processor 370 of the exercise equipment 40 may terminate the exercise mode. However, the present disclosure is not limited thereto. The third processor 370 of the exercise equipment 40 may also terminate the exercise mode by a manipulation of the user.

When the exercise mode of the exercise equipment 40 is terminated, in operation S750, the exercise equipment 40 may transmit, to the management server 10, a notification notifying that the exercise mode is terminated. While transmitting the notification, the exercise equipment 40 may transmit together the result of exercise by the user to the management server 10. The management server 10 may match the result of exercise with the user information and store the result of exercise in the database 120. Alternatively, the first processor 150 of the management server 10 may convert the result of exercise into calories and store the same in the database 120. The management server 10 may also transmit the stored result of exercise or the like to an external device, e.g., the user terminal 50 or the manager terminal 60.

When the exercise is terminated, the management server 10 may determine exercise device 40 to use next for exercise and provide the result thereof to the user terminal 50, exercise equipment 40 with which current exercise is terminated, or next exercise equipment 40. A method of determining the exercise equipment 40 to use next for exercise is as described with reference to FIG. 6, and thus a detailed description thereof is omitted.

The system for the sports center according to an embodiment may display an exercise order suitable for an exercise plan to a user or provide information regarding the exercise equipment 40 or the like, on the basis of augmented reality or virtual reality. For example, the user terminal 50 may be a head mounted display based on augmented reality or virtual reality. The head mounted display may include an eye tracking sensor that tracks a gaze of the user.

The system for the sports center according to an embodiment of the present disclosure may transmit and receive related data from the management server 10 and provide information related to the exercise equipment 40 to the user through an augmented reality interface, e.g., the head mounted display.

The user may be granted an exercise plan on the basis of the management server 10, and pieces of exercise equipment 40 used by the user may be connected to the management server 10 through a network. In an environment described above, location information of the pieces of exercise equipment 40 and a movement status of the user may be stored in the management server 10. For example, the management server 10 may store information regarding the exercise equipment 40 possessed by a sports center and information regarding a location at which the exercise equipment 40 is arranged in the sports center.

As an embodiment, the management server 10 may provide an exercise order together with the exercise equipment 40 through the user terminal 50 based on arrangement information of the exercise equipment 40 and the exercise plan for the user. When the user terminal 50 is the head mounted display, information regarding the exercise equipment 40 and the exercise order may be provided on an augmented reality screen. For example, the eye tracking sensor of the user terminal 50 may track the gaze of the user and transmit the result thereof to the management server 10, and the management server 10 may determine the exercise equipment 40 gazed by the user based on the result of tracking by the eye tracking sensor and transmit information regarding the determined exercise equipment 40 to the user terminal 50. The user terminal 50 may provide the information regarding the exercise equipment 40 on the augmented reality screen.

Various types of information may be provided on the augmented reality screen, in addition to the information regarding the exercise device 40 and exercise order. For example, a state of whether or not the exercise equipment 40 is in use may be displayed, or information indicating next exercise equipment 40 may be displayed.

Figure 9:
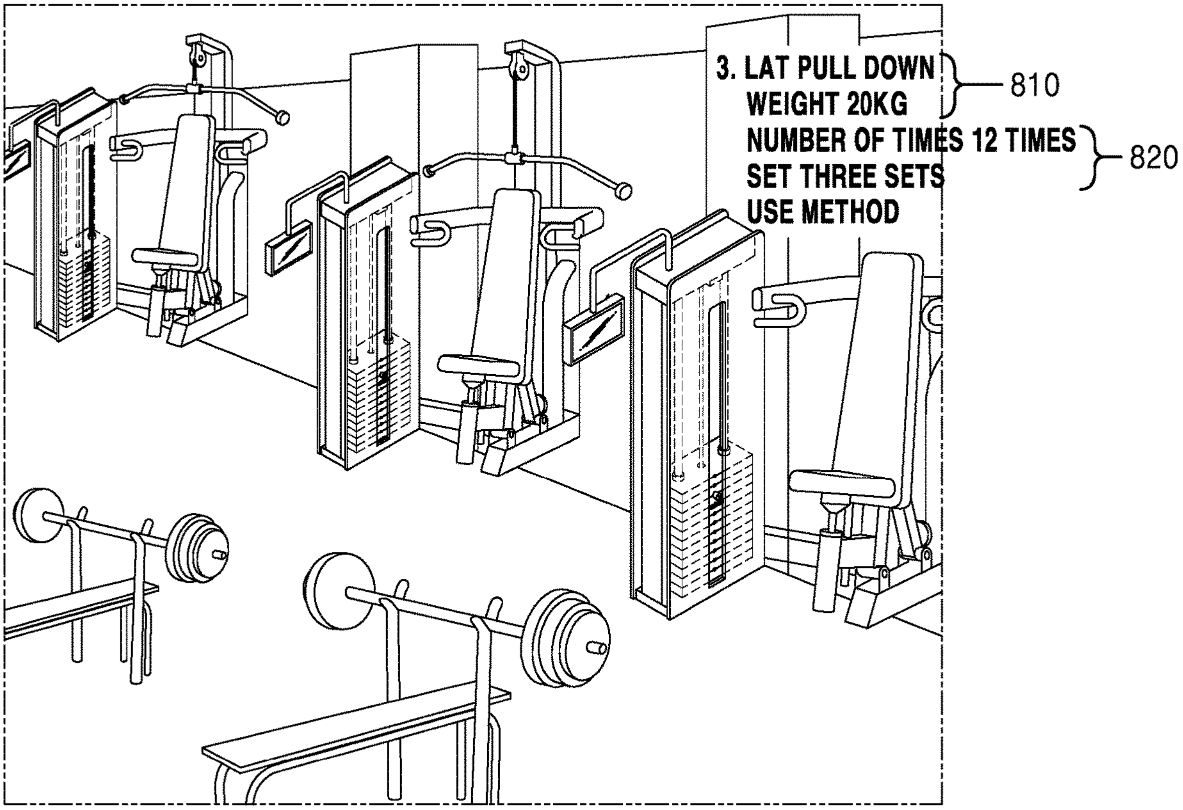
FIG. 9 is a reference view illustrating information regarding exercise equipment based on augmented reality, according to an embodiment.

FIG. 9 is a reference view illustrating information regarding exercise equipment based on augmented reality, according to an embodiment. For example, when a user looks inside a sports center while wearing a head mounted display, the sports center system 1 may provide information 810 regarding exercise equipment and information 820 regarding an exercise program, at a location corresponding to the exercise equipment. In addition, when the user selects a use method guidance interface 830 on an augmented reality screen, a moving picture image guiding a use method may be played back on the augmented reality screen.

A method according to an embodiment of the present disclosure may be implemented in the form of program instructions that may be performed through various computer units and recorded on a computer-readable medium. The computer-readable medium may include program instructions, data files, data structures, and the like alone or in combination. The program instructions recorded on the medium may be particularly designed and configured for the present disclosure, or may be known to or used by those skilled in the computer software. Examples of the computer-readable recording medium include magnetic media such as hard disks, floppy disks, and magnetic tapes, optical media such as CD-ROM and DVD, magneto-optical media such as floppy disks, and hardware devices particularly configured to store and execute program instructions, such as ROM, RAM, and flash memory. Examples of the program instructions include machine language code, such as those generated by a compiler, as well as high-level language code that may be executed by a computer by using an interpreter or the like.

Some embodiments of the present disclosure may also be implemented in the form of a recording medium including computer-executable instructions, such as a program module executed by a computer. The computer-readable medium may be any available medium that may be accessed by a computer, and includes both volatile and nonvolatile media, and removable and non-removable media. In addition, the computer-readable medium may include both a computer storage medium and a communication medium. The computer storage medium includes both volatile and nonvolatile, and removable and non-removable media implemented by any method or technology for storing information, such as computer-readable instructions, data structures, program modules, or other data. The communication medium typically includes computer-readable instructions, data structures, program modules, other data of modulated data signals such as carriers, or other transmission mechanisms, and includes any information transmission medium. In addition, some embodiments of the present disclosure may also be implemented as a computer program or computer program product that includes computer-executable instructions, such as computer programs executed by a computer.

A device-readable storage medium may be provided in the form of a non-transitory storage medium. Here, the “non-transitory storage medium” only indicates that it is a tangible device and does not include signals (e.g., electromagnetic waves), and this term does not distinguish between a case where data is semi-permanently stored in a storage medium and a case where the data is temporarily stored. For example, the non-transitory storage medium may include a buffer that temporarily stores data.

According to an embodiment, a method according to various embodiments disclosed in the present document may be included in a computer program product and provided. The computer program product may be traded between a seller and a purchaser as a commodity. The computer program product may be distributed in the form of a device-readable storage medium (e.g., compact disc read only memory (CD-ROM), or distributed (e.g., downloaded or uploaded) through an application store or directly between two user devices (e.g., smartphones) or online. In the case of online distribution, at least a portion of the computer program product (e.g., a downloadable app) may be temporarily stored or temporarily generated in a device-readable storage medium such as a server of a manufacturer, a server of an application store, or a memory of a relay server.

Embodiments have been described. One of ordinary skill in the art to which the present disclosure pertains may understand that the present disclosure may be implemented in a modified form without departing from the essential features of the present disclosure. Therefore, embodiments described herein should be considered in a descriptive sense only and not for purposes of limitation. The scope of the present disclosure is defined by claims, not by the above description, and all differences within the scope equivalent thereto should be interpreted as being included in the present disclosure.

The invention claimed is:

1. A system for operating a sports center, the system comprising:

an authentication device comprising at least one sensor configured to detect biometric information of a user, the authentication device being configured to perform authentication based on the detected biometric information and pre-registered biometric information of the user; and a management server in communication with the authentication device and a plurality of exercise equipment, the management server configured to:

grant activation authority over exercise equipment to a user terminal associated with the user based on the user being authenticated;

maintain a record of unused exercise equipment by identifying exercise equipment not utilized by the user among a list of exercise equipment associated with the user during a session period defined between an initial entry event and a subsequent exit event at the sports center;

determine a target exercise equipment for the user by identifying, from the record of unused exercise equipment, exercise equipment that is currently in a standby mode and located in closest proximity to the user; and control the exercise equipment so that a guidance indicator is displayed on the exercise equipment to identify the target exercise equipment to the user, wherein the target exercise equipment is configured to transition from the standby mode to an exercise mode when the user terminal enters a predetermined proximity zone, and wherein the management server is further configured to reset the record of unused exercise equipment associated with the user in response to detecting an exit event of the user from the sports center.

2. The system of claim 1, further comprising an entry device comprising at least one memory and at least one processor, and configured to determine whether the user enters or exits the sports center, wherein the management server is further configured to grant the activation authority over the exercise equipment to the user terminal when the user who has successfully authenticated is determined to enter the sports center through the entry device.

3. The system of claim 1, wherein the management server is further configured to terminate the granting of the activation authority to the user terminal when a certain period of time elapses after granting the activation authority to the user terminal.

4. The system of claim 1, wherein the management server is further configured to terminate the granting of the activation authority to the user terminal when the user is determined to have exit the sports center through an entry device comprising at least one memory and at least one processor.

5. The system of claim 1, wherein the biometric information of the user comprises at least one of face information, fingerprint information, iris information, blood vessel information, and voice information of the user.

6. The system of claim 1, wherein the exercise equipment is further configured to provide an exercise program based on information regarding the user.

7. The system of claim 1, wherein the user terminal comprises at least one of a mobile terminal, a wearable device, an RFID card, an NFC card, and a head mounted display.

8. A method of operating a sports center system of a sports center, the method comprising:

performing authentication by using biometric information of a user;

granting activation authority over exercise equipment to a user terminal associated with the user based on the user being authenticated;

maintaining a record of unused exercise equipment by identifying exercise equipment not utilized by the user among a list of exercise equipment associated with the user during a session period defined between an initial entry event and a subsequent exit event at the sports center;

determining a target exercise equipment for the user by identifying, from the record of unused exercise equipment, exercise equipment that is currently in a standby mode and located in closest proximity to the user;

controlling the exercise equipment so that a guidance indicator is displayed on the exercise equipment to identify the target exercise equipment to the user transitioning from the standby mode to an exercise mode when the user terminal enters a predetermined proximity zone; and resetting the record of unused exercise equipment associated with the user in response to detecting an exit event of the user from the sports center.

9. The method of claim 8, further comprising controlling an entry device comprising at least one memory and at least one processor, so that the user who is successfully authenticated enters the sports center, wherein the granting of the activation authority comprises granting the activation authority over the exercise equipment to the user terminal when the user who has successfully authenticated is determined to enter the sports center through the entry device.

10. The method of claim 9, further comprising terminating the granting of the activation authority to the user terminal when the user is determined to have exit the sports center through the entry device.

11. The method of claim 8, further comprising terminating the granting of the activation authority to the user terminal when a certain period of time elapses after granting the activation authority.

* * * * *